United States Patent
Xie

(10) Patent No.: US 11,190,707 B2
(45) Date of Patent: Nov. 30, 2021

(54) MOTION GHOST RESISTANT HDR IMAGE GENERATION METHOD AND PORTABLE TERMINAL

(71) Applicant: ARASHI VISION INC., Shenzhen (CN)

(72) Inventor: Liang Xie, Shenzhen (CN)

(73) Assignee: ARASHI VISION INC., Shenzhen (CN)

(*) Notice: Subject to any disclaimer, the term of this patent is extended or adjusted under 35 U.S.C. 154(b) by 0 days.

(21) Appl. No.: 17/057,688

(22) PCT Filed: May 20, 2019

(86) PCT No.: PCT/CN2019/087555
§ 371 (c)(1),
(2) Date: Nov. 22, 2020

(87) PCT Pub. No.: WO2019/223635
PCT Pub. Date: Nov. 28, 2019

(65) Prior Publication Data
US 2021/0211567 A1    Jul. 8, 2021

(30) Foreign Application Priority Data

May 22, 2018   (CN) .......................... 201810566525.X

(51) Int. Cl.
*H04N 5/235*   (2006.01)
*G06T 5/40*    (2006.01)
(Continued)

(52) U.S. Cl.
CPC ............. *H04N 5/2355* (2013.01); *G06T 5/40* (2013.01); *G06T 5/50* (2013.01); *H04N 5/2351* (2013.01);
(Continued)

(58) Field of Classification Search
None
See application file for complete search history.

(56) References Cited

U.S. PATENT DOCUMENTS

| 9,258,490 B2 | 2/2016 | Vidal-Naquet et al. |
| 2007/0025720 A1* | 2/2007 | Raskar .................... G06T 5/008 396/213 |

(Continued)

FOREIGN PATENT DOCUMENTS

| CN | 103973958 A | 8/2014 |
| CN | 105163047 A | 12/2015 |

(Continued)

*Primary Examiner* — James M Hannett
(74) *Attorney, Agent, or Firm* — Cheng-Ju Chiang

(57) ABSTRACT

The present invention provides a motion ghost resistant HDR image generation method and a portable terminal. A normally exposed image and an underexposed image are mapped to an overexposed image and are fused in the overexposed image, such that the values of the underexposed image are more considered to be used in the fused image in a bright place and the values of the overexposed image are more considered to be used in a dark place; therefore, both the dark place and bright place have abundant information and a motion ghost resistant HDR image is finally generated, thus improving the visual effect of a ghost-removed high-dynamic range image.

18 Claims, 1 Drawing Sheet

(51) Int. Cl.
*G06T 5/50* (2006.01)
*H04N 5/265* (2006.01)
(52) U.S. Cl.
CPC ... *H04N 5/265* (2013.01); *G06T 2207/20221* (2013.01)

(56) References Cited

U.S. PATENT DOCUMENTS

| | | | |
|---|---|---|---|
| 2013/0028509 A1* | 1/2013 | Moon | G06T 5/50 382/162 |
| 2014/0307960 A1* | 10/2014 | Sharma | H04N 5/23229 382/162 |
| 2015/0092075 A1* | 4/2015 | Kim | H04N 5/2355 348/222.1 |
| 2015/0249779 A1 | 9/2015 | Vidal-Naquet et al. | |
| 2018/0084181 A1 | 3/2018 | Sachs et al. | |
| 2019/0318460 A1* | 10/2019 | Bouzaraa | G06T 5/50 |
| 2020/0134787 A1* | 4/2020 | Bouzaraa | G06T 5/50 |

FOREIGN PATENT DOCUMENTS

| | | |
|---|---|---|
| CN | 105551061 A | 5/2016 |
| CN | 108833775 A | 11/2018 |

\* cited by examiner

MOTION GHOST RESISTANT HDR IMAGE GENERATION METHOD AND PORTABLE TERMINAL

CROSS REFERENCE TO RELATED APPLICATIONS

The present application is a 35 U.S.C. § 371 National Phase conversion of International (PCT) Patent Application No. PCT/CN2019/087555, filed on May 20, 2019, which claims priority of Chinese Patent Application No. 201810566525.X, filed on May 22, 2018, the disclosure of which is incorporated by reference herein. The PCT International Patent Application was filed and published in Chinese.

FIELD OF THE INVENTION

The present invention relates to the field of image processing, and particularly relates to a motion ghost resistant HDR image generation method and a portable terminal.

BACKGROUND OF THE INVENTION

A single exposure of modern digital cameras cannot cover the entire dynamic range of a natural scene. Traditional high dynamic range images cannot contain all the details in the overexposed and underexposed areas. High dynamic range images expand the covered dynamic range of a single image and to enhance image details by fusing a series of low dynamic range images with different exposures. High dynamic range technology and its good visual experience have been gradually applied to the fields of film and television special effects and other fields, which have very important theoretical research value and broad business foundation.

The existing fusion technology ensures that a fused image without ghosting can be obtained, and generally requires that the background of the images to be fused with different exposures are completely static. However, most of the images obtained in real scenes contain dynamic elements such as moving objects, which will lead to ghosting in the high dynamic range image obtained after fusion. The existing de-ghosting techniques usually directly removes all moving objects contained in the images to be fused in the fusion result, which to a certain extent makes the obtained high dynamic range image lose the authenticity of the original image.

Technical Problem

The present invention provides a motion ghost resistant HDR image generation method, a computer-readable storage medium and a portable terminal, which aim to solve the problem that the current high dynamic range image contains motion ghosting, thus improving the visual effect of a ghost-removed HDR image.

According to a first aspect, the present invention provides a motion ghost resistant HDR image generation method, comprising steps of:

Technical Solutions

According to a first aspect, the present invention provides a motion ghost resistant HDR method, comprising steps of:
acquiring a normally exposed image $I_1$, an underexposed image $I_2$ and an overexposed image $I_3$ shot continuously;
mapping and adjusting the brightness of the normally exposed image $I_1$ to be consistent with the brightness of the underexposed image $I_2$ and the overexposed image $I_3$ respectively, to obtain a first image $I_{12}$ and a second image $I_{13}$;
comparing both the underexposed image $I_2$ and the overexposed image $I_3$ with the first image $I_{12}$ and the second image $I_{13}$, respectively, and correcting pixels having great brightness differences in the underexposed image $I_2$ and the overexposed image $I_3$ to obtain a third image $I_2'$ and a fourth image $I_3'$ of which motion pixels are removed;
calculating a first weight map $w_1$, a second weight map $w_2$ and a third weight map $w_3$ of the normally exposed image $I_1$, the third image $I_2'$, and the fourth image $I_3'$, respectively;
using the brightness of the fourth image $I_3'$ as a reference, respectively adjusting the brightness of the normally exposed images $I_1$ and the third image $I_2'$ to obtain a fifth image $I_1''$ and a sixth image $I_2''$ that are highly exposed and have a consistent brightness to the fourth image $I_3'$; and
fusing the fifth image $I_1''$, the sixth image $I_2''$, and the fourth image $I_3'$ with the corresponding first weight map $w_1$, the second weight map $w_2$, and the third weight map $w_3$ respectively, to generate a motion ghost resistant HDR image.

Optionally, the normally exposed image $I_1$, the underexposed image $I_2$ and the overexposed image $I_3$ are three images taken in HDR mode.

Optionally, the step of mapping and adjusting, is to use histogram mapping to map and adjust the histogram of the normally exposed image $I_1$ to be consistent with the brightness of the underexposed image $I_2$ and the overexposed image $I_3$, to obtain the first image $I_{12}$ and the second image $I_{13}$ after brightness adjustment.

Optionally, the step can specifically be:
comparing, pixel by pixel, both the underexposed image $I_2$ and the overexposed image Is respectively with the first image $I_{12}$ and the second image $I_{13}$ after corresponding brightness adjustment of the normally exposed image $I_1$; and correcting motion pixels in the underexposed image $I_2$ and the overexposed image $I_3$ to obtain the third image $I_2'$ and the fourth image $I_3'$ of which motion pixels are removed;

optionally, comparing the underexposed image $I_2$ with the first image $I_{12}$ pixel by pixel and correcting motion pixels to obtain the third image $I_2'$, specifically by formulas: $V_3=V_1(1-W)+V_2 W$, $W=\min(1,3.0/|V_1-V_2|)$, where, $V_1$ is the brightness of the pixels at a certain position in the underexposed image $I_2$, $V_2$ is the brightness of the pixels at a corresponding position in the first image $I_{12}$, and $V_3$ is the brightness of the pixels at a corresponding position in the third image $I_2'$;

optionally, comparing the overexposed image $I_3$ with the second image $I_{13}$ pixel by pixel and correcting motion pixels to obtain the fourth image $I_3'$, specifically by formulas: $V_3'=V_1''(1-W')+V_2'W'$, $W'=\min(1,3.0/|V_1'-V_2'|)$, where, $V_1'$ is the brightness of the pixels at a certain position in the overexposed image $I_3$, $V_2'$ is the brightness of the pixels at a corresponding position in the second image $I_3$, and $V_3'$ is the brightness of the pixels at a corresponding position in the fourth image $I_3'$.

Optionally, calculating a first weight map $w_1$, a second weight map $w_2$ and a third weight map $w_3$, specifically by formulas:

$w_1 = 127.5 - |127.5 - I_1| + 1;$ $w_2 = I_2' + 1$ $w_3 = 255 - I_3 + 1.$

Optionally, the step of respectively adjusting the brightness of the normally exposed images $I_1$ and the third image $I_2'$ to obtain a fifth image $I_1''$ and a sixth image $I_2''$ specifically can be:

calculating the pixels of the fifth image $I_1''$ by the formula $y=a_1x^{b_1}$, where x is the brightness of the pixels in the normally exposed image $I_1$, y is the brightness of the pixels in the fifth image $I_1''$, and $a_1$ and $b_1$ are coefficients, both of which are calculated natural number;

calculating the pixels of the sixth image $I_2''$ by the formula $y'=a_2x'^{b_2}$, where x' is the brightness of the pixels in the third image $I_2'$, y' is the brightness of the pixels in the sixth image $I_2''$, and $a_2$ and $b_2$ are coefficients, both of which are calculated natural number.

Optionally, a weighted fusion, specifically:

uses the formula $I=w_1I_1''+w_2I_2''+w_3I_3'$ to fuse pixels in the image, where I is an HDR image.

According to a second aspect, the present invention provides a computer-readable medium that stores one or more computer programs including a set of computer-executable instructions, which when being executed by one or more processors, cause the one or more processors to perform the above-mentioned steps of the motion ghost resistant HDR image generation method.

According to a third aspect, the present invention provides a portable terminal, comprising:

one or more processors;

a memory; and one or more computer programs where the one or more computer programs are stored in the memory and are configured to be executed by the one or more processors, and when being executed by the one or more processors, cause the one or more processors to perform the above-mentioned steps of the motion ghost resistant HDR image generation method.

Advantages

In the present invention, motion pixels are removed, and a normally exposed image and an underexposed image are mapped to an overexposed image and are fused in the overexposed image, such that the values of the underexposed image are more considered to be used in the fused image in a bright place and the values of the overexposed image are more considered to be used in a dark place; therefore, both the dark place and bright place have abundant information and a motion ghost resistant HDR image is finally generated, thus improving the visual effect of a ghost-removed high-dynamic range image.

DETAILED DESCRIPTION OF THE INVENTION

The foregoing objects, technical solutions and advantages of the invention will be much clearer from the following detail description taken with the accompanying drawings and embodiments. It should be understood that the specific embodiments described herein are only used to explain the present invention and are not intended to limit the present invention.

In order to explain the technical solutions of the present invention, the following will be described by specific embodiments.

First Embodiment

Figure 1:
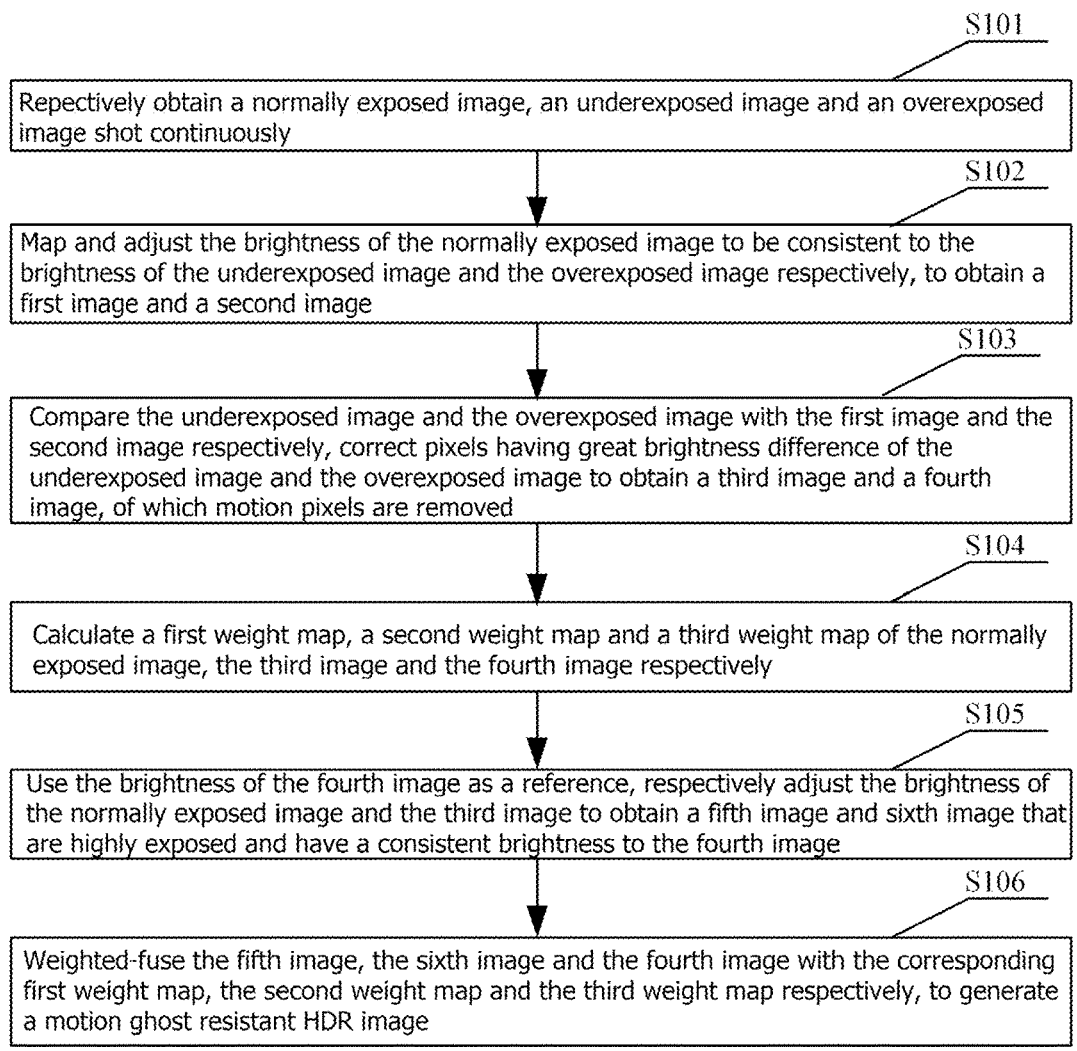
FIG. 1 is a flowchart of a motion ghost resistant HDR image generation method in accordance with a first embodiment of the present invention.

Referring to FIG. 1, a motion ghost resistant HDR (High-Dynamic Range) method provided in the first embodiment of the present invention, comprises the following steps:

S101, acquiring a normally exposed image ($I_1$), an underexposed image ($I_2$) and an overexposed image ($I_3$) shot continuously;

wherein the normally exposed image ($I_1$), the underexposed image ($I_2$) and the overexposed image ($I_3$) are three images taken in HDR mode.

S102, mapping and adjusting the brightness of the normally exposed image ($I_1$) to be consistent with the brightness of the underexposed image ($I_2$) and the overexposed image ($I_3$) respectively, to obtain a first image ($I_{12}$) and a second image ($I_{13}$);

wherein mapping and adjusting, is to use histogram mapping to map and adjust the histogram of the normally exposed image ($I_1$) to be consistent with the brightness of the underexposed image ($I_2$) and the overexposed image ($I_3$), to obtain the first image ($I_{12}$) and the second image ($I_{13}$) after brightness adjustment.

S103, comparing both the underexposed image ($I_2$) and the overexposed image ($I_3$) with the first image ($I_1$) and the second image ($I_{13}$), respectively, and correcting pixels having great brightness differences in the underexposed image ($I_2$) and the overexposed image ($I_3$) to obtain a third image ($I_2$) and a fourth image ($I_3$) of which motion pixels are removed;

wherein motion pixels refer to pixels with obvious brightness differences in corresponding positions in two comparative images; comparing, pixel by pixel, the underexposed image ($I_2$) and the overexposed image ($I_3$) respectively with the first image ($I_{12}$) and the second image ($I_{13}$) after corresponding brightness adjustment of the normally exposed image ($I_1$); and correcting motion pixels in the underexposed image ($I_2$) and the overexposed image ($I_3$) to obtain the third image ($I_2'$) and the fourth image ($I_3'$) of which motion pixels are removed;

comparing the underexposed image ($I_2$) with the first image ($I_{12}$) pixel by pixel and correcting motion pixels to obtain the third image ($I_2'$), specifically by formulas:

$$V_3=V_1(1-W)+V_2W$$

$$W=\min(1,3.0/|V_1-V_2|)$$

where, ($V_1$) is the brightness of the pixels at a certain position in the underexposed image ($I_2$), if the brightness value is greater than 240, it will remain unchanged; ($V_2$) is the brightness of the pixels at a corresponding position in the first image ($I_{12}$), and ($V_3$) is the brightness of the pixels at a corresponding position in the third image ($I_2'$).

Comparing the overexposed image ($I_3$) with the second image ($I_{13}$) pixel by pixel and correcting motion pixels to obtain the fourth image ($I_3'$), specifically by formulas:

$$V_3'=V_1'(1-W')+V_2'W'$$

$$W'=\min(1,3.0/|V_1'-V_2'|)$$

where ($V_1'$) is the brightness of the pixels at a certain position in the overexposed image ($I_3$), ($V_2'$) is the brightness of the pixels at a corresponding position in the second image ($I_{13}$), and ($V_3'$) is the brightness of the pixels at a corresponding position in the fourth image ($I_3'$).

S104, calculating a first weight map ($w_1$), a second weight map ($w_2$) and a third weight map ($w_3$) of the normally exposed image ($I_1$), the third image ($I_2'$), and the fourth image ($I_3'$), respectively;

where calculating the first weight map ($w_1$), the second weight map ($w_2$) and the third weight map ($w_3$), by formulas:

$$w_1 = 127.5 - |127.5 - I_1| + 1;$$

$$w_2 = I_2' + 1$$

$$w_3 = 255 - I_3' + 1.$$

S105, using the brightness of the fourth image ($I_3'$) as a reference, respectively adjusting the brightness of the normally exposed images ($I_1$) and the third image ($I_2'$) to obtain a fifth image ($I_1''$) and a sixth image ($I_2''$) that are highly exposed and have a consistent brightness to the fourth image ($I_3'$);

calculating the pixels of the fifth image ($I_1''$) by the formula $y = a_1 x^{b_1}$, where x is the brightness of the pixels in the normally exposed image (I), y is the brightness of the pixels in the fifth image ($I_1''$), and $a_1$ and $b_1$ are coefficients, both of which are calculated natural number;

taking the logarithm of both sides of the formula $y = a_1 x^{b_1}$ to get:

$$\ln(y) = \ln(a_1) + b_1 \ln(x)$$

inputting N pixels to obtain N equations above, calculating the above formula by the least square method to obtain $\ln(a_1)$, $b_1$, and then obtaining the estimated values of $a_1$ and $b_1$;

then, using the estimated values of $a_1$ and $b_1$ in the previous step as initial values, optimizing $a_1$ and $b_1$ using the Gauss-Newton method, and denoting the error as $e = a_1 x^{b_1} - y$; for N pixels, there are N error equations:

$$e_i = a_1 x_i^{b_1} - y_i, i = 1, 2 \ldots N$$

the total error:

$$f = \Sigma e_i^2$$

using Gauss-Newton method, the above estimated parameter $a_1$ and $b_1$ can be optimized to obtain the definite values of $a_1$ and $b_1$;

calculating the pixels of the sixth image ($I_2''$) by the formula $y' = a_2 x'^{b_2}$, where x' is the brightness of the pixels in the third image ($I_2'$), y' is the brightness of the pixels in the sixth image ($I_2''$), and $a_2$ and $b_2$ are coefficients, both of which are calculated natural number;

taking the logarithm of both sides of the formula $y' = a_2 x'^{b_2}$ to get:

$$\ln(y') = \ln(a_2) + b_2 \ln(x')$$

inputting N pixels to obtain N equations above, calculating the above formula by the least square method to obtain $\ln(a_2)$, $b_2$, and then obtaining the estimated values of $a_2$ and $b_2$;

then, using the estimated values of $a_2$ and $b_2$ in the previous step as initial values, optimizing $a_2$ and $b_2$ using the Gauss-Newton method, and denoting the error as $e' = a_2 x'^{b_2} - y'$; for N pixels, there are N error equations:

$$e_i' = a_2 x_i'^{b_2} - y_i', i = 1, 2 \ldots N$$

the total error:

$$f = \Sigma e_i'^2$$

using Gauss-Newton method, the above estimated parameter $a_2$ and $b_2$ can be optimized to obtain the definite values of $a_2$ and $b_2$.

S106, fusing the fifth image ($I_1''$), the sixth image ($I_2''$), and the fourth image ($I_3'$) with the corresponding first weight map ($w_1$), the second weight map ($w_2$), and the third weight map ($w_3$) respectively, to generate a motion ghost resistant HDR image.

Fusing the images, specifically by the formula:

$$I = w_1 I_1'' + w_2 I_2'' + w_3 I_3'$$

where I is an HDR image, and finally obtaining a motion ghost resistant HDR image I.

In the present invention, for a normally exposed image, the closer the brightness is to the intermediate value, the greater the weight map; for an underexposed image, the higher the brightness, the greater the weight map; for an overexposed image, the lower the brightness, the greater the weight map. Therefore, the brightness values of the underexposed image are more considered to be used in the fused image in a bright place and the brightness values of the overexposed image are more considered to be used in a dark place; such that both the dark place and bright place have abundant information.

Second Embodiment

The second embodiment of the present invention provides a computer-readable storage medium that stores one or more computer programs, the one or more computer programs can be executed by one or more processors to perform the steps of the motion ghost resistant HDR image generation method provided in the first embodiment.

Third Embodiment

Figure 2:
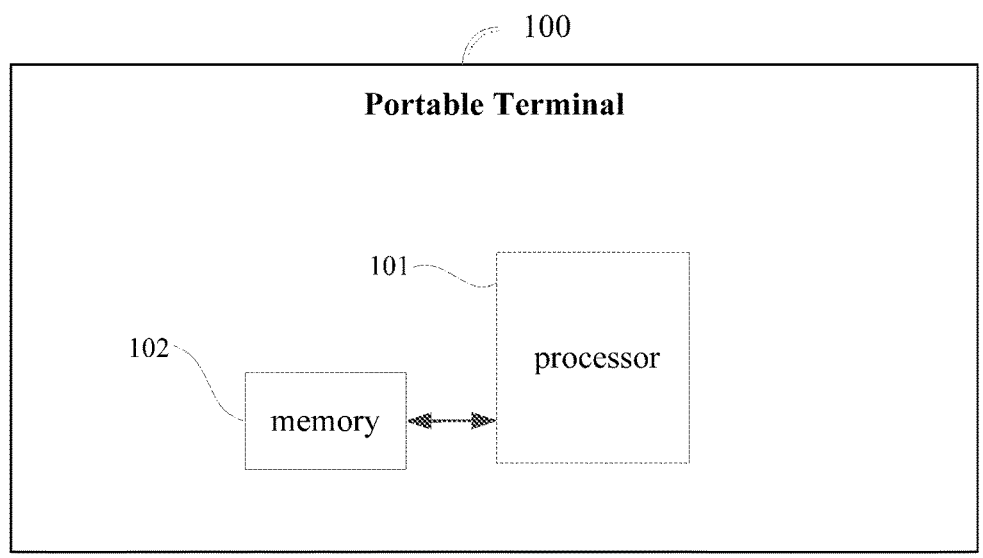
FIG. 2 is a schematic structural diagram of a portable terminal in accordance with a third embodiment of the present invention.

FIG. 2 illustrates a structural block diagram of a portable terminal provided in the third embodiment of the present invention. A portable terminal 100 comprises: one or more processors 101, a memory 102, and one or more computer programs, where the one or more processors 101 and the memory 102 are connected by a bus, the one or more computer programs are stored in the memory 102, and are configured to be executed by the one or more processors 101. The one or more processors 101 execute the one or more computer programs to perform the steps of the motion ghost resistant HDR image generation method provided in the first embodiment.

The invention claimed is:

1. A motion ghost resistant HDR image generation method, wherein comprising steps of:
acquiring a normally exposed image $I_1$, an underexposed image $I_2$ and an overexposed image $I_3$ shot continuously;
mapping and adjusting the brightness of the normally exposed image $I_1$ to be consistent with the brightness of the underexposed image $I_2$ and the overexposed image $I_3$ respectively, to obtain a first image $I_{12}$ and a second image $I_{13}$;
comparing both the underexposed image $I_2$ and the overexposed image $I_3$ respectively with the first image $I_{12}$ and the second image $I_{13}$, and correcting pixels having great brightness differences in the underexposed image $I_2$ and the overexposed image $I_3$ to obtain a third image $I_2'$ and a fourth image $I_3'$ of which motion pixels are removed;

calculating a first weight map $w_1$, a second weight map $w_2$ and a third weight map $w_3$ of the normally exposed image $I_1$, the third image $I_2'$, and the fourth image $I_3'$, respectively;

using the brightness of the fourth image $I_3'$ as a reference, respectively adjusting the brightness of the normally exposed images $I_1$ and the third image $I_2'$ to obtain a fifth image $I_1''$ and a sixth image $I_2''$ that are highly exposed and have a consistent brightness to the fourth image $I_3'$; and fusing the fifth image $I_1''$, the sixth image $I_2''$, and the fourth image $I_3'$ respectively with the corresponding first weight map $w_1$, the second weight map $w_2$, and the third weight map $w_3$, to generate a motion ghost resistant HDR image.

2. The method of claim 1, wherein the normally exposed image $I_1$, the underexposed image $I_2$ and the overexposed image $I_3$ are three images taken in HDR mode.

3. The method of claim 1, wherein the step of mapping and adjusting, is to use histogram mapping to map and adjust the histogram of the normally exposed image $I_1$ to be consistent with the brightness of the underexposed image $I_2$ and the overexposed image $I_3$, to obtain the first image $I_{12}$ and the second image $I_{13}$ after brightness adjustment.

4. The method of claim 1, wherein the step of comparing both the underexposed image $I_2$ and the overexposed image $I_3$ respectively with the first image $I_{12}$ and the second image $I_{13}$, specifically comprises:

comparing, pixel by pixel, both the underexposed image $I_2$ and the overexposed image $I_3$ respectively with the first image $I_{12}$ and the second image $I_{13}$ which are obtained after correspondingly adjusting the brightness of the normally exposed image $I_1$; and correcting motion pixels in the underexposed image $I_2$ and the overexposed image $I_3$ to obtain the third image $I_2'$ and the fourth image $I_3'$ of which motion pixels are removed.

5. The method of claim 4, wherein the step of comparing the underexposed image $I_2$ with the first image $I_{12}$ pixel by pixel and correcting motion pixels to obtain the third image $I_2'$, specifically uses the following formulas: $V_3 = V_1(1-W) + V_2 W$, $W = \min(1, 3.0/|V_1 - V_2|)$, where, $V_1$ is the brightness of the pixels at a certain position in the underexposed image $I_2$, $V_2$ is the brightness of the pixels at a corresponding position of the certain position in the first image $I_{12}$, and $V_3$ is the brightness of the pixels at a corresponding position of the certain position in the third image $I_2'$.

6. The method of claim 4, wherein the step of comparing the overexposed image $I_3$ with the second image $I_{13}$ pixel by pixel and correcting motion pixels to obtain the fourth image $I_3'$, specifically uses the following formulas: $V_3' = V_1'(1-W') + V_2'W'$, $W' = \min(1, 3.0/|V_1' - V_2'|)$, where, $V_1'$ is the brightness of the pixels at a certain position in the overexposed image $I_3$, $V_2'$ is the brightness of the pixels at a corresponding position of the certain position in the second image $I_{13}$, and $V_3'$ is the brightness of the pixels at a corresponding position of the certain position in the fourth image $I_3'$.

7. The method of claim 1, wherein the step of calculating a first weight map $w_1$, a second weight map $w_2$ and a third weight map $w_3$ of the normally exposed image $I_1$, the third image $I_2'$, and the fourth image $I_3'$, respectively, specifically uses the following formulas:

$w_1 = 127.5 - |127.5 - I_1| + 1;$ $w_2 = I_2' + 1$ $w_3 = 255 - I_3' + 1.$

8. The method of claim 1, wherein the step of adjusting the brightness of the normally exposed images $I_1$ and the third image $I_2'$ to obtain a fifth image $I_1''$ and a sixth image $I_2''$ that are highly exposed and have a consistent brightness to the fourth image $I_3'$, specifically comprises:

calculating the pixels of the fifth image $I_1''$ by the formula $y = a_1 x^{b_1}$, where x is the brightness of the pixels in the normally exposed image $I_1$, y is the brightness of the pixels in the fifth image $I_1''$, and $a_1$ and $b_1$ are coefficients, both of which are calculated natural number; and calculating the pixels of the sixth image $I_2''$ by the formula $y' = a_2 x'^{b_2}$, where x' is the brightness of the pixels in the third image $I_2'$, y' is the brightness of the pixels in the sixth image $I_2''$, and $a_2$ and $b_2$ are coefficients, both of which are calculated natural number.

9. The method of claim 1, wherein the step of fusing the fifth image $I_1''$, the sixth image $I_2''$, and the fourth image $I_3'$ respectively with the corresponding first weight map $w_1$, the second weight map $w_2$, and the third weight map $w_3$, to generate a motion ghost resistant HDR image, specifically comprises:

using the following formula: $I = w_1 I_1'' + w_2 I_2'' + w_3 I_3'$ to fuse the pixels in the images, where I is an HDR image.

10. A non-transitory computer-readable storage medium that stores one or more computer programs including a set of computer-executable instructions, wherein one or more processors execute the set of computer-executable instructions to perform steps of a motion ghost resistant HDR image generation method comprising:

acquiring a normally exposed image $I_1$, an underexposed image $I_2$ and an overexposed image $I_3$ shot continuously;

mapping and adjusting the brightness of the normally exposed image $I_1$ to be consistent with the brightness of the underexposed image $I_2$ and the overexposed image $I_3$ respectively, to obtain a first image $I_{12}'$ and a second image $I_{13}$;

comparing both the underexposed image $I_2$ and the overexposed image $I_3$ respectively with the first image $I_{12}$ and the second image $I_{13}$, and correcting pixels having great brightness differences in the underexposed image $I_2$ and the overexposed image $I_3$ to obtain a third image $I_2'$ and a fourth image $I_3'$ of which motion pixels are removed;

calculating a first weight map $w_1$, a second weight map $w_2$ and a third weight map $w_3$ of the normally exposed image $I_1$, the third image $I_2'$, and the fourth image $I_3'$, respectively;

using the brightness of the fourth image $I_3'$ as a reference, respectively adjusting the brightness of the normally exposed images $I_1$ and the third image $I_2'$ to obtain a fifth image $I_1''$ and a sixth image $I_2''$ that are highly exposed and have a consistent brightness to the fourth image $I_3'$; and fusing the fifth image $I_1''$, the sixth image $I_2''$, and the fourth image $I_3'$ respectively with the corresponding first weight map $w_1$, the second weight map $w_2$, and the third weight map $w_3$, to generate a motion ghost resistant HDR image.

11. A portable terminal, comprising:
one or more processors;
a memory; and
one or more computer programs, where the one or more computer programs including a set of computer-executable instructions are stored in the memory and are configured to be executed by the one or more processors, wherein when being executed by the one or more processors, cause the one or more processors to perform steps of a motion ghost resistant HDR image generation method comprising:
acquiring a normally exposed image $I_1$, an underexposed image $I_2$ and an overexposed image $I_3$ shot continuously;
mapping and adjusting the brightness of the normally exposed image $I_1$ to be consistent with the brightness of the underexposed image $I_2$ and the overexposed image $I_3$ respectively, to obtain a first image $I_{12}$ and a second image $I_{13}$;
comparing both the underexposed image $I_2$ and the overexposed image $I_3$ respectively with the first image $I_{12}$ and the second image $I_{13}$, and correcting pixels having great brightness differences in the underexposed image $I_2$ and the overexposed image $I_3$ to obtain a third image $I_2'$ and a fourth image $I_3'$ of which motion pixels are removed;
calculating a first weight map $w_1$, a second weight map $w_2$ and a third weight map $w_3$ of the normally exposed image $I_1$, the third image $I_2'$, and the fourth image $I_3'$, respectively;
using the brightness of the fourth image $I_3'$ as a reference, respectively adjusting the brightness of the normally exposed images $I_1$ and the third image $I_2'$ to obtain a fifth image $I_1''$ and a sixth image $I_2''$ that are highly exposed and have a consistent brightness to the fourth image $I_3'$; and
fusing the fifth image $I_1''$, the sixth image $I_2''$, and the fourth image $I_3'$ respectively with the corresponding first weight map $w_1$, the second weight map $w_2$, and the third weight map $w_3$, to generate a motion ghost resistant HDR image.

12. The portable terminal of claim 11, wherein the step of mapping and adjusting, is to use histogram mapping to map and adjust the histogram of the normally exposed image $I_1$ to be consistent with the brightness of the underexposed image $I_2$ and the overexposed image $I_3$, to obtain the first image $I_{12}$ and the second image $I_{13}$ after brightness adjustment.

13. The portable terminal of claim 11, wherein the step of comparing both the underexposed image $I_2$ and the overexposed image $I_3$ respectively with the first image $I_{12}$ and the second image $I_{13}$, specifically comprises:
comparing, pixel by pixel, both the underexposed image $I_2$ and the overexposed image $I_3$ respectively with the first image $I_{12}$ and the second image $I_{13}$ which are obtained after correspondingly adjusting the brightness of the normally exposed image $I_1$; and correcting motion pixels in the underexposed image $I_2$ and the overexposed image $I_3$ to obtain the third image $I_2'$ and the fourth image $I_3'$ of which motion pixels are removed.

14. The portable terminal of claim 13, wherein the step of comparing the underexposed image $I_2$ with the first image $I_{12}$ pixel by pixel and correcting motion pixels to obtain the third image $I_2'$, specifically uses the following formulas: $V_3=V_1(1-W)+V_2W$, $W=\min(1, 3.0/|V_1-V_2|)$, where, $V_1$ is the brightness of the pixels at a certain position in the underexposed image $I_2$, $V_2$ is the brightness of the pixels at a corresponding position of the certain position in the first image $I_{12}$, and $V_3$ is the brightness of the pixels at a corresponding position of the certain position in the third image $I_2'$.

15. The portable terminal of claim 13, wherein the step of comparing the overexposed image $I_3$ with the second image $I_{13}$ pixel by pixel and correcting motion pixels to obtain the fourth image $I_3'$, specifically uses the following formulas: $V_3'=V_1'(1-W')+V_2'W'$, $W'=\min(1, 3.0/|V_1'-V_2'|)$, where, $V_1'$ is the brightness of the pixels at a certain position in the overexposed image $I_3$, $V_2'$ is the brightness of the pixels at a corresponding position of the certain position in the second image $I_{13}$, and $V_3'$ is the brightness of the pixels at a corresponding position of the certain position in the fourth image $I_3'$.

16. The portable terminal of claim 11, wherein the step of calculating a first weight map $w_1$, a second weight map $w_2$ and a third weight map $w_3$ of the normally exposed image $I_1$, the third image $I_2'$, and the fourth image $I_3'$, respectively, specifically uses the following formulas:

$$w_1=127.5-|127.5-I_1|+1;$$

$$w_2=I_2+1;$$

$$w_3=255-I_3'+1.$$

17. The portable terminal of claim 11, wherein the step of adjusting the brightness of the normally exposed images $I_1$ and the third image $I_2'$ to obtain a fifth image $I_1''$ and a sixth image $I_2''$ that are highly exposed and have a consistent brightness to the fourth image $I_3'$, specifically comprises:
calculating the pixels of the fifth image $I_1''$ by the formula $y=a_1x^{b1}$, where x is the brightness of the pixels in the normally exposed image $I_1$, y is the brightness of the pixels in the fifth image $I_1''$, and $a_1$ and $b_1$ are coefficients, both of which are calculated natural number; and
calculating the pixels of the sixth image $I_2''$ by the formula $y'=a_2x'^{b2}$, where x' is the brightness of the pixels in the third image $I_2'$, y' is the brightness of the pixels in the sixth image $I_2''$, and $a_2$ and $b_2$ are coefficients, both of which are calculated natural number.

18. The portable terminal of claim 11, wherein the step of fusing the fifth image $I_1''$, the sixth image $I_2''$, and the fourth image $I_3'$ respectively with the corresponding first weight map $w_1$, the second weight map $w_2$, and the third weight map $w_3$, to generate a motion ghost resistant HDR image, specifically comprises:
uses the following formula: $I=w_1I_1''+w_2I_2''+w_3I_3'$ to fuse the pixels in the images, where I is an HDR image.

* * * * *